United States Patent [19]

Born

[11] 4,348,766
[45] Sep. 7, 1982

[54] CHEMICALLY FUELLED LASER AND METHOD FOR INCREASING THE EFFICIENCY OF SUCH LASERS

[75] Inventor: Gunthard Born, Munich, Fed. Rep. of Germany

[73] Assignee: Messerschmitt-Boelkow-Blohm GmbH, Munich, Fed. Rep. of Germany

[21] Appl. No.: 120,504

[22] Filed: Feb. 11, 1980

[30] Foreign Application Priority Data

Feb. 21, 1979 [DE] Fed. Rep. of Germany ....... 2906632

[51] Int. Cl.³ .............................................. H01S 3/09
[52] U.S. Cl. ....................................... 372/89; 372/55
[58] Field of Search ................... 331/94.5 P, 94.5 G, 331/94.5 D

[56] References Cited

U.S. PATENT DOCUMENTS

| | | | |
|---|---|---|---|
| 3,876,959 | 4/1975 | Biancard et al. | 331/94.5 G |
| 3,886,475 | 5/1975 | Pinsley | 331/94.5 P |
| 3,886,477 | 5/1975 | Ruby et al. | 331/94.5 G |
| 3,984,784 | 10/1976 | Pinsley | 331/94.5 G |
| 4,206,429 | 6/1980 | Pinsley | 331/94.5 G |
| 4,213,102 | 7/1980 | Warren, Jr. et al. | 331/94.5 G |

*Primary Examiner*—William L. Sikes
*Assistant Examiner*—Léon Scott, Jr.
*Attorney, Agent, or Firm*—W. G. Fasse; D. F. Gould

[57] ABSTRACT

The efficiency of a chemically fuelled laser with regenerative cooling of its combustion chamber is increased by using the fuels as coolant in the diffuser. The heat resulting from this cooling in the diffuser is supplied in a regenerative manner to the combustion chamber or rather to the laser gas.

8 Claims, 1 Drawing Figure

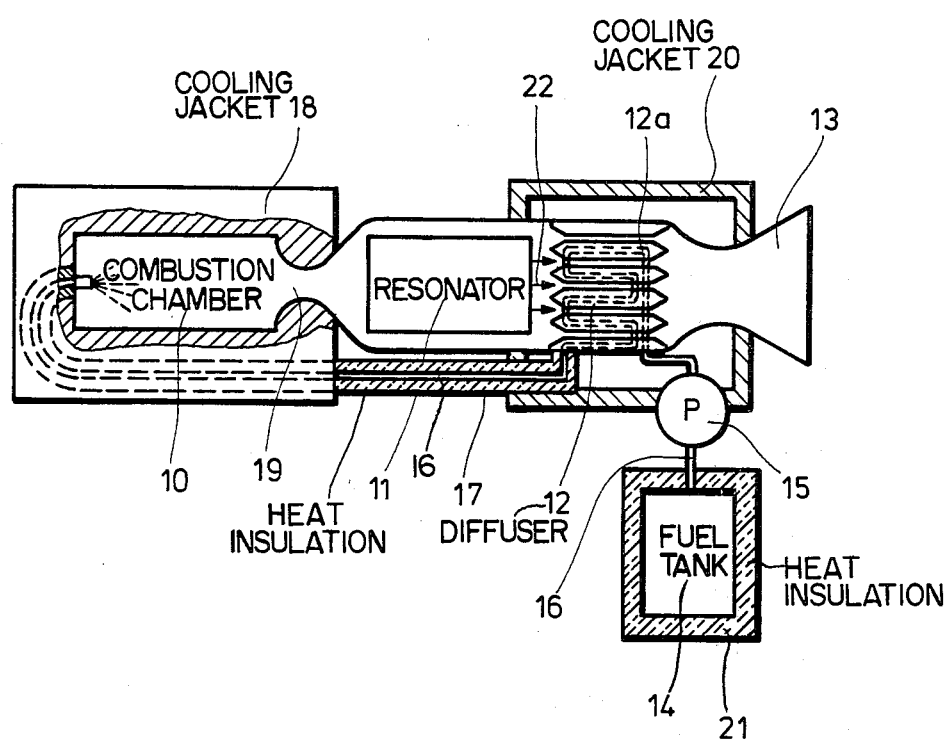

CHEMICALLY FUELLED LASER AND METHOD FOR INCREASING THE EFFICIENCY OF SUCH LASERS

BACKGROUND OF THE INVENTION

The invention relates to chemically fuelled laser and to a method for increasing the efficiency of such lasers. More specifically, the invention relates to lasers having a combustion chamber and a diffuser which are both cooled in a regenerative manner.

It is conventional to increase the efficiency of rockets with the aid of a regenerative cooling. In this type of cooling the fuel substances are conducted as a coolant through the wall of the combustion chamber. In this manner the heat produced by the combusted gas and supplied to the walls of the combustion chamber is not lost. Rather, the heat is again supplied to the combustion chamber due to the resulting heating of the fuel materials.

In chemical lasers the laser medium is also produced by a combustion, for example, in a gas dynamic $CO_2$ laser or in a chemical fluorine hydrogen laser. It is known in connection with such lasers to cool the combustion chamber thereof in the above mentioned regenerative manner.

Generally, chemically fuelled lasers are characterized in that the laser gas is cooled by expansion through Laval nozzles whereby a small proportion of the chemically supplied heat is delivered as laser power. Thereafter the laser gas flows through a diffuser where it is compressed substantially to atmospheric pressure whereupon it exits into the atmosphere or into a container. During this diffusion and compression the gas achieves a temperature in the diffuser which approximates that of the gas combustion chamber.

OBJECTS OF THE INVENTION

In view of the foregoing it is the aim of the invention to achieve the following objects singly or in combination:

to increase the efficiency in chemically fuelled lasers of the type described above;

to provide a gas dynamic, chemically fuelled laser in which the fuel is conducted through the diffuser into the combustion chamber; and to substantially double the efficiency of such lasers.

SUMMARY OF THE INVENTION

According to the invention there is provided a method for increasing the efficiency of a chemically fuelled laser in which the chemical laser fuels are used to cool the diffuser whereby the heat content of the laser fuels is increased and the so heated laser fuels are supplied into the combustion chamber whereby the heat content gained in the diffuser is supplied to the combustion chamber and thus to the laser gas in a regenerative manner. Since the laser fuels are heated as they cool the diffuser, these heated laser fuels return the heat into the combustion chamber. This heat return is referred to as being "regenerative".

According to the invention there is further provided a chemically fuelled laser having a combustion chamber in a housing. A resonator is operatively connected to the combustion chamber. A diffuser is operatively connected to the resonator. Laser gas discharge means are operatively connected to the diffuser. Fuel supply means are operatively connected through fuel conduits to the combustion chamber and the fuel conduits comprise conduit elements arranged in heat exchange contact with the diffuser.

BRIEF FIGURE DESCRIPTION

In order that the invention may be clearly understood, it will now be described, by way of example, with reference to the single FIGURE of the accompanying drawings which shows a somewhat schematic view, partially in section of a gas dynamic laser according to the invention.

DETAILED DESCRIPTION OF A PREFERRED EXAMPLE EMBODIMENT AND OF THE BEST MODE OF THE INVENTION

The invention extends the regenerative cooling to the diffuser 12, whereby a substantial proportion of the exchanged heat is not lost but rather reintroduced into the laser gas.

As mentioned above, according to the prior art typically only a few percent of the chemically produced heat is recovered in the combustion chamber. On the other hand about 80% of the generated heat are being lost in the diffuser in devices of the prior art. The invention recovers a substantial proportion of the heat lost in the diffuser in a laser modified as set forth above. As a result, the invention achieves the advantage that the quantity of fuels needed for the heat generation may be reduced by a corresponding factor and the efficiency may be increased to the respective extent.

Another substantial advantage of the method and apparatus according to the invention is seen in that the pressure recovery in the diffuser 12 is improved if heat is withdrawn from the gas entering into the diffuser at supersonic speed. Simultaneously the invention achieves that the harmful boundary layers occuring in the diffuser grow to a lesser extent than on diffuser walls which are not cooled. Thus, the combustion chamber 10 and the diffuser 12 are provided with a respective cooling jacket 18 and 20 in a manner known as such.

According to the invention the diffuser 12 is provided with a plurality of fuel conduit elements 12a, for example connected in series with one another and arranged in heat exchange contacts with the walls forming the diffuser channels. The individual fuel conduit elements are physically arranged in parallel to each other but interconnected in series between the fuel pump 15 and the conduit sections 16 connecting the fuel supply chamber 14 with the combustion chamber 10 in its cooling jacket 18.

Each fuel conduit element 12a has a diameter of a few millimeters and a length corresponding typically to a multiple of the diameter within the range of about 10 to 20 times the diameter. The walls of the channels of the diffuser 12 through which the elements 12a extend are made of relatively thin material having good heat conductivity, for example, copper or a copper berylium alloy. The wall thickness between the gas flow 22 and the cooling conduit 16, or rather, the conduit elements 12a in the diffuser 12 corresponds to a few tenths of a millimeter.

In order to make sure that the heat taken up by the fuel flowing through the conduit elements 12a, for example, conveyed by the pump 15 is sufficiently supplied to the combustion chamber 10 without any heat loss while travelling through the conduit section 16 downstream of the elements 12a, the fuel supply conduit 16 is surrounded by a heat insulating jacket 17 which extends in the cooling jacket 20 from the diffuser 12 and in the cooling jacket 18 all the way to the combustion chamber 10.

Further, it has been found to be advantageous to encase the fuel supply container 14 with a heat insulating layer 21. The combustion chamber is operatively connected to the laser resonator 11, which provides an optical resonant cavity as is known, 11 by a Laval nozzle 19. The resonator in turn is operatively connected to the diffuser so that the laser gas flow 22 may pass through the diffuser 12 into a gas exit nozzle 13 which discharges the laser gas, for example, to the atmosphere.

The method according to the invention as applied to a gas dynamic $CO_2$ laser has the following improvements. In order to provide a comparing, a conventional laser of this type without a regenerative cooling in the diffuser operates with a laser gas having typically the following compositions:

8% of $CO_2$ by volume;
4% of $H_2O$ by volume;
and the remainder being nitrogen ($N_2$).

By combustion of $C_6H_6$ with $N_2O$ a combustion chamber gas temperature of 2000° K. is achieved.

By way of the regenerative cooling according to the invention in the diffuser 12 the heat exchange results, for example, in an improvement of the efficiency by a factor of 2, whereby the laser gas composition for achieving the same combustion chamber gas temperature of 2000° K. is as follows:

4% of $CO_2$ by volume;
2% of $H_2O$ by volume;
and the remainder being nitrogen.

The foregoing comparison shows that the efficiency has been doubled in a $CO_2$ laser. This is considered to be a surprising result. Additionally, it is now possible to provide a neck diameter for the required Lavel nozzles 19 which is twice as large as has been possible conventionally, whereby the number of nozzles required may be reduced to one half the number required heretofore. This results in a substantial reduction in the manufacturing costs for such lasers and the overall expenditures are correspondingly substantially reduced.

It has been found that the method according to the invention may also be advantageously employed in connection with chemical fluorine—hydrogen lasers. In such lasers molecular hydrogen or rather deuterium is caused to form a chemical compound with atomic fluorine in the resonator space. The atomic fluorine is produced in a combustion chamber. The temperatures in such combustion chamber are chemically relatively high in the order of about 2000° K. As a result, harmful foreign components are necessarily introduced into the laser gas. However, according to the invention by the use of the preheating of the fluorine in the diffuser by deriving the heat from the diffuser channels the proportion of foreign materials required for the heating is reduced and the efficiency is substantially increased.

Although the invention has been described with reference to specific example embodiments it is to be understood, that it is intended to cover all modifications and equivalents within the scope of the appended claims.

What is claimed is:

1. A method for increasing the efficiency of a chemically fuelled $CO_2$ laser including a combustion chamber and a diffuser, comprising the steps of cooling said diffuser by means of chemical laser fuels selected from the group consisting of $CO_2$, $N_2O$, $C_6H_6$, and $N_2$, whereby the heat content of said laser fuels is increased, and supplying said laser fuels with the increased heat content into the combustion chamber through a heat insulated supply conduit, whereby the heat content gained by said laser fuels in the diffuser is supplied to the combustion chamber and thus to a laser gas produced in said combustion chamber from said laser fuels through said heat insulated supply conduit, whereby the $CO_2$ content of said laser gas is substantially reduced to 50% as compared to the $CO_2$ content of a laser gas in a conventional $CO_2$ laser.

2. The method of claim 1, wherein said step of cooling the diffuser comprises passing said chemical laser fuels through a plurality of cooling ducts operatively arranged in the diffuser, wherein said step of supplying the laser fuels into the combustion chamber, comprises extending said supply conduit along the shortest possible distance from said diffuser to said combustion chamber, wherein said chemical laser fuels consist of a proportion of 94% of nitrogen by volume, 4% of $CO_2$ by volume, the remainder being 2% of $H_2O$ by volume, said method further comprising supplying said nitrogen proportion in liquid form and vaporizing the liquid nitrogen in the diffuser to increase the fuel temperature prior to feeding the laser fuel into the combustion chamber, and insulating a fuel supply conduit inside a cooling jacket of said diffuser, inside a cooling jacket of said combustion chamber, and also between the combustion chamber and the diffuser.

3. A chemically fuelled $CO_2$ laser, comprising combustion chamber means for combusting laser fuels consisting of $CO_2$, $N_2O$, $C_6H_6$, and $N_2$, cooling jacket means for enclosing said combustion chamber means in said cooling jacket means, resonator means for providing an optical resonant cavity operatively connected to said combustion chamber means, diffuser means for diffusing an active laser gas produced from said laser fuels operatively connected to said resonator means, discharge means operatively connected to said diffuser means for discharging the active laser gas out of said $CO_2$ laser, fuel supply means for supplying said laser fuels, fuel conduit means operatively connecting said fuel supply means to said combustion chamber means for feeding said laser fuels into said combustion chamber, said fuel conduit means comprising heat exchange conduit elements arranged in heat exchange contact with said diffuser means for preheating said laser fuels on their way into the combustion chamber means, said $CO_2$ laser further comprising cooling jacket means surrounding said diffuser means, and heat insulating means for operatively enclosing said fuel conduit means between said diffuser and said combustion chamber and inside said cooling jacket means for substantially retaining the heat content of the preheated laser fuels, whereby the efficiency of the $CO_2$ laser is substantially doubled as compared to a conventional $CO_2$ laser.

4. The laser of claim 3, wherein said diffuser means comprise a plurality of parallel channels, said fuel conduit elements being arranged in heat exchange contact with said channels.

5. The laser of claim 3 or 4, wherein said fuel conduit elements are arranged in series in said diffuser.

6. The laser of claim 3, wherein said parallel diffuser channels have walls made of relatively thin material having a good heat conducting coefficient.

7. The laser of claim 3, further comprising heat insulating means operatively enclosing said fuel conduit means.

8. The laser of claim 3, further comprising cooling jacket means for said fuel supply means.

* * * * *